(12) United States Patent
Fahlgren et al.

(10) Patent No.: US 9,401,502 B2
(45) Date of Patent: Jul. 26, 2016

(54) BATTERY PACK

(75) Inventors: Anton Fahlgren, San Francisco, CA (US); Nicolas Lylyk, Palo Alto, CA (US); Hai Nguyen, San Jose, CA (US)

(73) Assignee: Nokia Technologies Oy, Espoo (FI)

( * ) Notice: Subject to any disclaimer, the term of this patent is extended or adjusted under 35 U.S.C. 154(b) by 1133 days.

(21) Appl. No.: 13/444,419

(22) Filed: Apr. 11, 2012

(65) Prior Publication Data

US 2013/0273413 A1   Oct. 17, 2013

(51) Int. Cl.
*H01M 2/10*   (2006.01)

(52) U.S. Cl.
CPC .......... *H01M 2/1022* (2013.01); *H01M 2/1061* (2013.01); *H01M 2/1066* (2013.01); *Y10T 29/49108* (2015.01)

(58) Field of Classification Search
None
See application file for complete search history.

(56) References Cited

U.S. PATENT DOCUMENTS

| | | | |
|---|---|---|---|
| 5,618,318 A | 4/1997 | Reddy et al. | |
| 6,224,995 B1 † | 5/2001 | Fauteux | |
| 6,689,511 B2 † | 2/2004 | Yamada | |
| 6,709,785 B2 * | 3/2004 | Lee | H01M 6/46 29/623.1 |
| 7,273,674 B1 † | 9/2007 | Frustaci | |
| 2005/0202314 A1 | 9/2005 | Cherng et al. | |
| 2006/0088759 A1 | 4/2006 | Roh | |
| 2012/0015223 A1 | 1/2012 | Bhardwaj et al. | |
| 2012/0015236 A1 | 1/2012 | Spare | |

FOREIGN PATENT DOCUMENTS

| | | |
|---|---|---|
| EP | 1 113 511 A1 | 7/2011 |
| JP | 2001028275 A | 1/2001 |
| KR | 20030066960 A | 8/2003 |
| KR | 20070016295 A | 12/2007 |

OTHER PUBLICATIONS

Office Action for Korean Application No. 10-2014-7031313 dated May 30, 2016.

* cited by examiner
† cited by third party

*Primary Examiner* — Sarah A Slifka
(74) *Attorney, Agent, or Firm* — Alston & Bird LLP

(57) ABSTRACT

In some example embodiments, a battery described herein includes a plurality of foldable cells, that when folded takes the form of an asymmetric battery that can utilize available space within a portable electronic device and further is configured to present a curved form factor. In some example embodiments, the apparatus includes a first set of cells and a second set of cells. The first set of cells and the second set of cells are disposed on a sheet that is foldable such that the first set of cells and the second set of cells form a folded battery configuration.

16 Claims, 4 Drawing Sheets

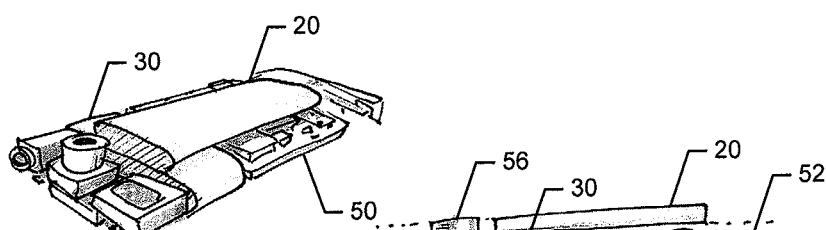
FIG. 4a  FIG. 4b
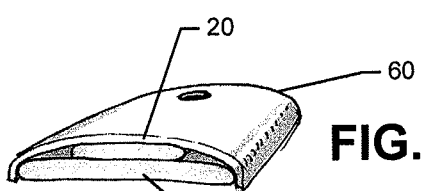
FIG. 4c
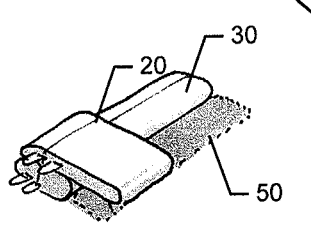 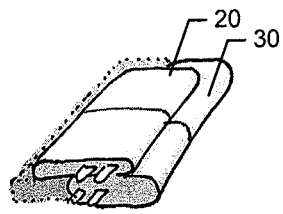
FIG. 4d  FIG. 4e
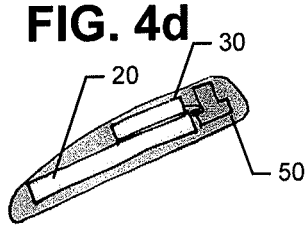 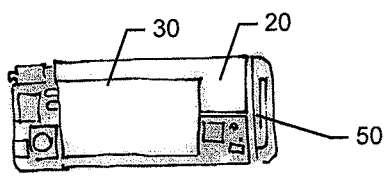
FIG. 4f  FIG. 4g

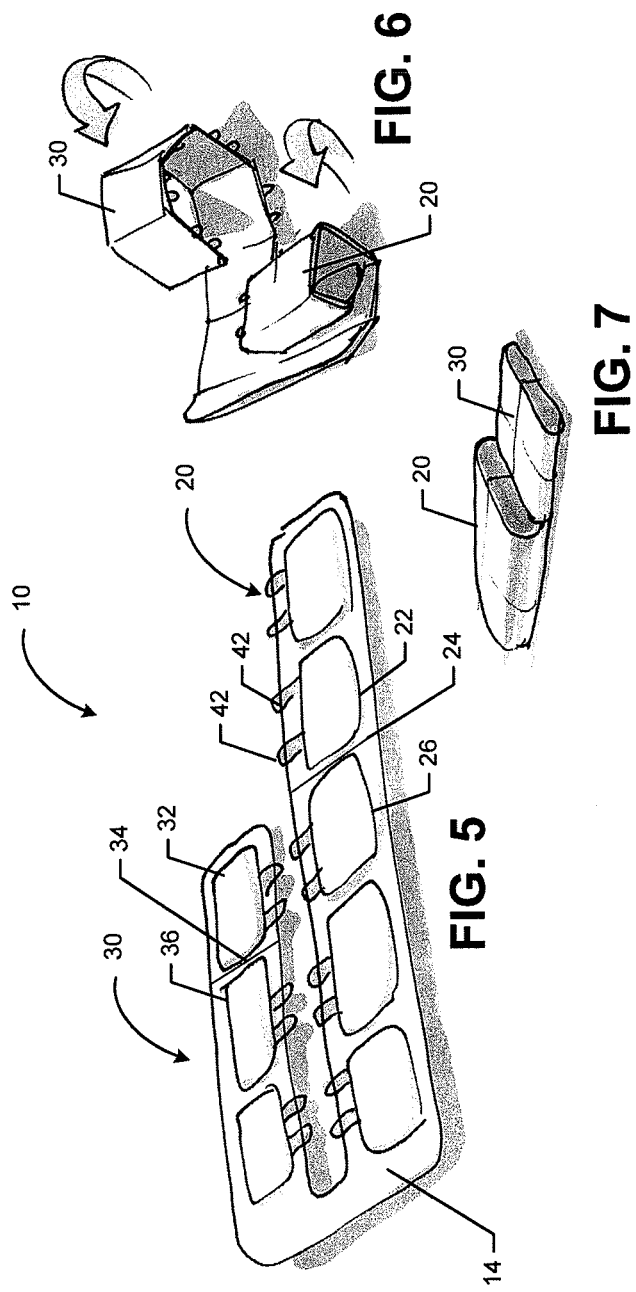

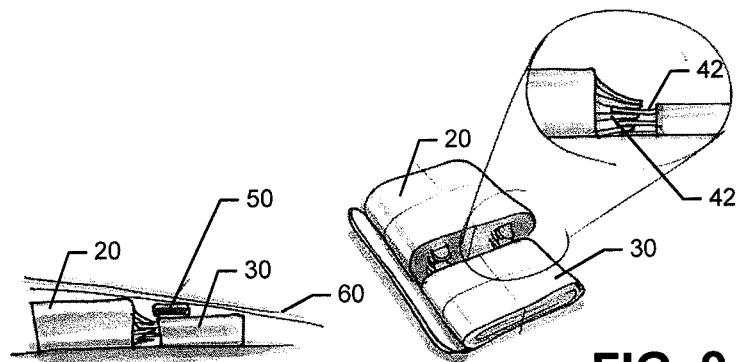
FIG. 8  FIG. 9
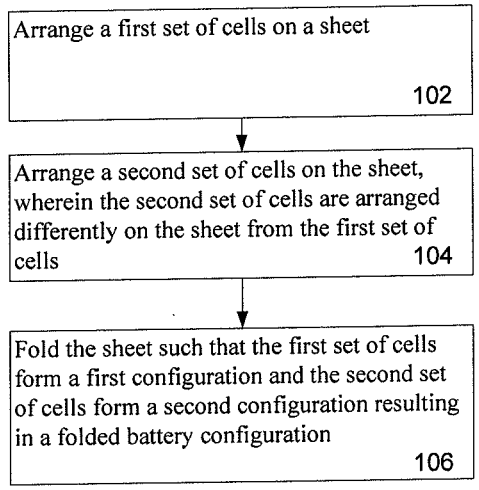
| Arrange a first set of cells on a sheet |
|---|
| 102 |
| Arrange a second set of cells on the sheet, wherein the second set of cells are arranged differently on the sheet from the first set of cells    104 |
| Fold the sheet such that the first set of cells form a first configuration and the second set of cells form a second configuration resulting in a folded battery configuration    106 |
FIG. 10

BATTERY PACK

TECHNOLOGICAL FIELD

Embodiments of the present invention relate generally to battery technology and, more particularly, to a foldable battery for a portable electronic device.

BACKGROUND

Portable electronic devices are made with consistently smaller form factors. Even though the internal components are becoming smaller and smaller, batteries and battery technology generally lags behind other technological advancements and consistently consumes a large portion of the form factor of a portable electronic device. Batteries tend to generally take on rectangular box type form factor. Thus, because most battery designs are rectangular in shape, most portable devices have a rectangular form factor to maximize the use of space. In current portable electronic devices, to have a curved and aesthetically pleasing form factor, space is generally wasted between the battery and a case making the portable electronic device seem larger and a result may be less appealing. Additionally, there may also be wasted space between the internal components and the case and/or between certain internal components.

BRIEF SUMMARY

In some example embodiments, a battery described herein includes a plurality of foldable cells. The cells when folded generally take the form of an asymmetric battery that can utilize available space within a portable electronic device and may further present a curved form factor. For example, the battery may comprise a first set of cells that take on a first shape when folded and a second set of cells that take on a second shape when folded. In some example embodiments, the first shape and the second shape are configured to be aligned within the portable electronic device using available space between the internal components of the portable electronic device and between the internal components and a casing that encloses the internal components and the battery.

In some example embodiments, the apparatus includes a first set of cells and a second set of cells. The first set of cells and the second set of cells are disposed on a sheet that is foldable such that the first set of cells and the second set of cells form a folded battery configuration.

In further example embodiments, an apparatus includes a casing, a plurality of internal components and a battery. The battery includes a first set of cells and a second set of cells. In some example embodiments, the first set of cells and the second set of cells are disposed on a sheet that is foldable such that a resulting folded battery configuration is sized to fit in a space defined by the plurality of internal components and the casing.

In yet further example embodiments, a method may include arranging a first set of cells on a sheet. The method of an example embodiment may further include arranging a second set of cells on the sheet. In some example embodiments, the second set of cells are arranged differently on the sheet from the first set of cells. The method further includes folding the sheet such that the first set of cells form a first configuration and the second set of cells form a second configuration resulting in a folded battery configuration.

BRIEF DESCRIPTION OF THE DRAWINGS

Figure 1:
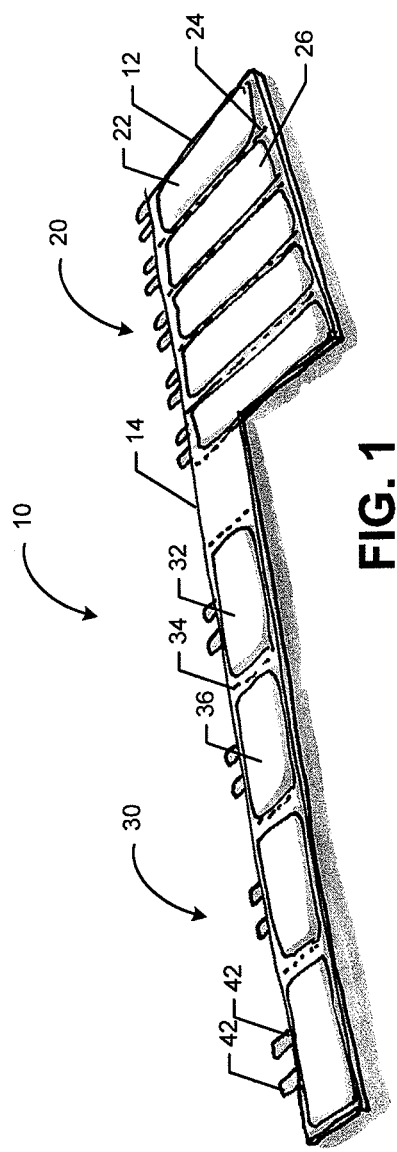
Figure 3:
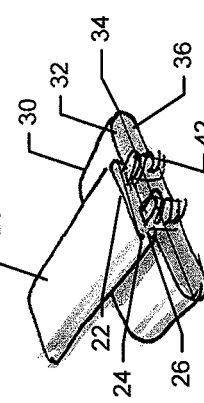
Figure 2:
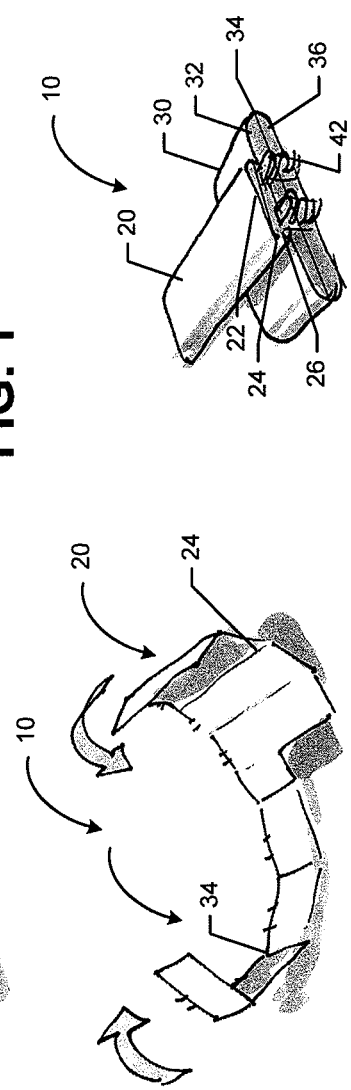

Having thus described the example embodiments of the invention in general terms, reference will now be made to the accompanying drawings, which are not necessarily drawn to scale, and wherein:

FIG. 1 is a perspective view of a battery according to some example embodiments of the current invention;

FIG. 2 is a perspective view of a foldable battery according to some example embodiments of the current invention;

FIG. 3 is a perspective view of a folded battery according to some example embodiments of the current invention;

FIGS. 4a-4g are various views of a folded battery and internal components in a casing according to some example embodiments of the current invention;

FIG. 5 is a perspective view of a battery according to some example embodiments of the current invention;

FIG. 6 is a perspective view of a foldable battery according to some example embodiments of the current invention;

FIG. 7 is a perspective view of a folded battery according to some example embodiments of the current invention;

FIG. 8 is a cross sectional view of a folded battery in a casing according to some example embodiments of the current invention;

FIG. 9 is a perspective view of a folded battery with an exploded view of a plurality of braided connector pads according to some example embodiments of the current invention; and FIG. 10 illustrates a flow diagram illustrating the process of providing a folded battery according to some example embodiments.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

In some example embodiments, a battery is disclosed that is configured to be foldable into a plurality of shapes. The foldable shapes are configured to optimally fit between and around internal components. For example, the height of a folded battery configuration may be equal to or less than the height of a camera within the portable electronic device. The battery is further configured to contain a plurality of cells disposed in parallel or in series on a sheet. The sheet may be generally divided into a first set of cells and a second set of cells.

In some example embodiments, the sheet may be of generally manipulatable material, such that each cell may be folded, stacked and/or rolled with a neighbor cell within each set of cells. Each cell within a set of cells is configured to be of the same size and shape, such that when folded over a neighbor cell, the cell covers or is covered by a neighbor cell having the same or similar dimensions. For example when a first cell is folded onto a second cell, the resultant structure has a width and length equal to the width and length of the first and second cell, the resultant structure has height or thickness that is equal to the height or thickness of the first cell plus the height or thickness of the second cell.

The first set of cells and the second set of cells are connected by a defined connector in the sheet. The connector functions, in some example embodiments, as an offset to space the first set of cells from the second set of cells. Alternatively or additionally, the connector aligns the first set of cells with the second set of cells thus defining the shape of the first set of cells and the second set of cells in a folded configuration. In its folded battery configuration, the battery may take the form of a "T", "L" or other shapes as shown with reference to FIGS. 1-9. In some example embodiments, the first and second sets of cells may take alternative shapes, may have alternative sizes, alternative heights or thickness and/or may be aligned differently within a casing of a portable electronic device.

Each cell within the sheet is configured to have a first connector pad and a second connector pad extending outwardly from the cell. The connector pads are configured to provide terminals that function to transfer energy to/from each cell. When in the folded battery configuration, the connector pads may be aligned such that the first connector pads are in a first plane when viewing the folded battery configuration from a top view and the second connector pads are in a second plane when viewing the folded battery configuration from a top view (see e.g. FIG. 3).

Alternatively or additionally, the connector pads extending from the first set of cells may extend toward and overlap the connector pads extending from the second set of cells. Therefore, when in a folded battery configuration, the connector pads of the first set of cells are braided with the connector pads of the second set of cells forming a single cell.

FIG. 1 is a perspective view of a battery 10 configured to provide power to a portable electronic device according to some example embodiments of the current invention. The battery 10 includes a plurality of cells, such as cells 22, 26, 32, 36. The cells as described herein may take numerous forms, sizes, heights, thickness, and may have provide different capacities. For example the cells, 22, 26, 32, 36 may have different dimensions and different alignments within the sheet 12 as well as within a portable electronic device. The cells, such as cells 22, 26, 32, 36 may takes the form of rechargeable cells such as lithium-ion cells, nickel cadmium (NiCd) cells, nickel metal hydride (NiMH) cells and/or the like. The cells may be disposed within a sheet 12. The sheet 12 may be made up of a plurality of materials and may be of flexible or rigid construction. In either construction, the sheet 12 is configured to define cell divisions, such as divisions 24, 34 between each of the cells 22, 26, 32, 36, such that each cell may be folded about each division 24, 34. Further, each cell, such as cells 22, 26, 32, 36, comprise connector pads 42 that extend outwardly from the cells 22, 26, 32, 36.

The battery 10 of some example embodiments may be divided into a first set of cells 20 and a second set of cells 30. Although only two sets of cells are shown in FIG. 1, additional sets of cells may be provided in additional embodiments. Further, each set of cells may contain the same number of cells or, as shown with respect to the example embodiment of FIG. 1, the first set of cells 20 and the second set of cells 30 may contain a different number of cells. Generally, the number of cells is defined by available space within as portable electronic device, the capacity of the cells as well as the dimensions of the cells themselves.

Each cell of the first set of cells 20 may be configured to be, but need not be restricted to be, of a similar size, shape and may further be configured to be of a similar capacity. Each cell of the first set of cells 20 are foldable about a division, such that when folded define a first shape. By way of example a cell 22 and a neighbor cell 26 are divided within the sheet 12 by a division 24. The division 24 defines a folding axis in which the cell 22 may be folded about the axis defined by the division 24 such that the cell 22 covers or is covered by the neighbor cell 26. The division, such as division 24, 34 may be of flexible material or may be another rotatable structure that functions to allow the rotation and/or folding of the cells.

The act of folding a cell 22 over neighbor cell 26 creates a curved connection between the cell 22 and the neighbor cell 26 resulting in a generally curved profile. Each cell of the first set of cells 20 has a division, similar to division 24, and thus may be folded into the first shape, as is shown with respect to the first set of cells 20 shown with respect to FIG. 3.

Each cell of the second set of cells 30 are of a similar size and shape and are foldable such that when folded define a second shape. Each cell of the second set of cells 30 has a division, similar to division 34, and thus may be folded into the second shape, as is shown with respect to the second set of cells 30 shown with respect to FIG. 3.

In some example embodiments, the cells of the second set of cells 30 are a different shape and/or orientation when compared to the cells in the first set of cells 20. By way of example, a cell 32 and a neighboring cell 36 are divided within the sheet 12 by a division 34. The division 34 defines a folding axis in which the cell 32 may be folded about the axis such that the cell 32 covers or is covered by the neighbor cell 36. Each cell of the first set of cells 30 have a division, similar to division 34 and thus may be folded into the second shape as is shown with respect to the second set of cells 30 shown in FIG. 3.

The first set of cells 20 and the second set of cells 30 are connected using a connector 14. The connector 14 includes at least a portion of the sheet 12 that is not configured to contain a cell. The connector 14 is configured to provide spacing and alignment between the first set of cells 20 and the second set of cells 30. In other words the connector 14 provides spacing and alignment to enable a folded battery configuration, such as the "T" configuration shown with respect to FIG. 3.

FIG. 2 is a perspective view of a foldable battery 10 according to some example embodiments of the current invention. As is shown with respect to FIG. 2, the first set of cells 20 and the second set of cells 30 are configured to be folded about the divisions, such as divisions 24, 34. The cells may be folded, stacked and/or rolled as demonstrated by the directional arrows of FIG. 2. It will be appreciated that any folding pattern may be used to create the folded battery shown with respect to FIG. 3, however by folding the cells from the outer cells toward the connector, the resultant structure will resemble a generally curved form factor (see e.g. FIG. 3).

FIG. 3 is a perspective view of a folded battery 10 according to some example embodiments of the current invention. The folded battery 10 of FIG. 3 generally depicts a "T" shape with the first set of cells 20 extending vertically, whereas the second set of cells 30 extend horizontally when viewed from the top. The division 24 is shown between cell 22 and the neighbor cell 26 and defines an edge of the sets of cells 20 when viewed from the top. The connector pads are proximately located to one another and are aligned across each of the cells. The foldable nature of the cells and the sheet 12 creates a generally curved form factor.

FIGS. 4a-4g illustrate various views of the folded battery 10 and internal components 50 surrounded by a casing 60 according to some example embodiments of the current invention. FIG. 4a illustrates a perspective view of the first set of cells 20 extending lengthwise along the internal components 50. The height of the first set of cells 20 is generally aligned with the height of the internal components 50. The second set of cells 30 is disposed in a gap defined by the internal components 50.

FIG. 4b illustrates a cross sectional view of the battery shown in FIG. 4a. The second set of cells has a height and/or thickness defined by height 52 which has the same or similar height to the internal components 50. The first set of cells when combined with the second set of cells has a height 54, the height 54 being equal to the height of the internal components, such as the camera 56. Heights 52, 54 demonstrate that the battery 10 advantageously fills the available space in the portable electronic device as is defined by the internal components 50 and the casing 60. The advantageous use of space is further shown with respect to FIG. 4c.

FIGS. 4d-4g show multiple views of additional configurations of a first set of cells 20 and a second set of cells 30. Multiple arrangements are possible and as shown by FIGS. 4d-4g, the arrangements can be adapted based on the structure of the internal components 50. In some example embodiments the first set of cells 20 may be aligned so that they are perpendicular to the second set of cells. In other example embodiments the first set of cells 20 may be parallel to the second set of cells 30 but may take on different dimensions and/or alignment.

FIG. 5 is a perspective view of a battery 10 according to some example embodiments of the current invention. In some example embodiments, the battery 10 may have a first set of cells 20 and a second set of cells 30 that are disposed in parallel on a sheet 12. The sheet 12 is configured such that it positions the first set of cells 20 directly opposite to the second set of cells 30. The connector pads 42 of the first set of cells 20 extend outwardly in the direction of the second set of cells 30. The connector pads 42 of the second set of cells 30 extend outwardly in the direction of the first set of cells 20, such the connector pads 42 of the second set of cells 30 overlaps the connector pads 42 of the first set of cells 20. As described with respect to FIG. 1, the cells, such as cells 22, 26, 32, 36 are configured to be folded about a division, such as divisions 24, 34 as is shown with respect to FIG. 6 resulting in a folded battery as represented in FIG. 7.

In some example embodiments, the first set of cells 20 are configured to be folded separately from the second set of cells 20, such that as the connector pads 42 of the first set of cells 20 are braided with the connector pads 42 of the second set of cells. In some example embodiments, the first set of cells 20 and the second set of cells 30 are simultaneously folded to create an electrical connection between the first set of cells 20 and the second set of cells 30 as is shown with respect to FIG. 9. The braided connector pads 42 enable the first set of cells 20 and the second set of cells 30 to function as a single cell.

FIG. 8 shows a cross sectional view of the battery 10 surrounded by a casing 60. In some example embodiments, a space is defined by the casing 60, the first set of cells 20 and the second set of cells 30. The defined space may be advantageously occupied by internal components 50 to maximize the available space within the casing 60.

FIG. 10 illustrates a flow diagram illustrating the process of providing a folded battery according to some example embodiments. As is shown with respect to operation 102, a first set of cells 20 are arranged on a sheet 12, such as is shown with respect to at least FIGS. 1 and 5. As is shown with respect to operation 104, a second set of cells 30 are arranged on the sheet, such as is shown with respect to at least FIGS. 1 and 5. In some example embodiments, the second set of cells 30 are arranged differently on the sheet 12 from the first set of cells 20. As is shown with respect to operation 106, the sheet 12 is folded such that the first set of cells 20 form a first configuration and the second set of cells 30 form a second configuration resulting in a folded battery configuration, similar to the folded battery configuration of at least FIGS. 3 and 7.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising:
    a first set of cells, wherein each of the first set of cells comprises a first shape; and
    a second set of cells, wherein each of the second set of cells comprises a second shape;
    wherein the first set of cells and the second set of cells are disposed on a sheet that is foldable such that the first set of cells and the second set of cells form a folded battery configuration, wherein in the folded battery configuration, the first shape of the first set of cells only partially overlaps the second shape of the second set of cells,
    wherein the folded battery configuration comprises a first thickness and a second thickness, wherein the first thickness is defined where the first shape of the first set of cells, overlaps the second shape of the second set of cells, and the second thickness is defined where the first shape of the first set of cells does not overlap the second shape of the second set of cells, and
    wherein the first set of cells, in the folded configuration, form a stack of cells having the first shape, and wherein the second set of cells, in the folded configuration, form a stack of cells having the second shape.

2. The apparatus of claim 1, wherein a cell of the first set of cells is defined by a first set of dimensions and a cell of the second set of cells is defined by a second set of dimensions, the first set of dimensions being different from the second set of dimensions.

3. The apparatus of claim 2, wherein the first set of cells disposed on the sheet are foldable to form a first shape and the second set of cells disposed on the sheet are foldable to form a second shape, the first shape and the second shape being of different dimensions.

4. The apparatus of claim 1, further comprising connector pads that extend outwardly from each cell of the first set of cells and the second set of cells.

5. The apparatus of claim 4, wherein in the folded battery configuration, the connector pads that extend outwardly from each cell of the first set of cells and each cell of the second set of cells and are aligned.

6. The apparatus of claim 5, wherein the first set of cells has a greater number cells than the second set of cells.

7. The apparatus of claim 6, wherein the first set of cells is disposed on the sheet opposite to the second set of cells disposed on the sheet, such that the folded battery configuration results in the connector pads extending outwardly from the first set of cells and the connector pads extending outwardly from the second set of cells being braided.

8. The apparatus of claim 7, wherein a first cell in the first set of cells and a second cell in the first set of cells are divided on the sheet by a division such that when folded, the first cell rotates about the division.

9. An apparatus comprising:
a casing;
a plurality of internal components; and
a battery, the battery comprising:
  a first set of cells, wherein each of the first set of cells comprises a first shape; and
  a second set of cells, wherein each of the second set of cells comprises a second shape,
  wherein the first set of cells and the second set of cells are disposed on a sheet that is foldable such that a resulting folded battery configuration is sized to fit in a space defined by the plurality of internal components and the casing, wherein in the folded battery configuration, the first shape of the first set of cells only partially overlaps the second shape of the second set of cells,
  wherein the folded battery configuration comprises a first thickness and a second thickness, wherein the first thickness is defined where the first shape of the first set of cells overlaps the second shape of the second set of cells, and the second thickness is defined where the first shape of the first set of cells does not overlap the second shape of the second set of cells, and
  wherein the first set of cells, in the folded configuration, form a stack of cells having the first shape, and wherein the second set of cells, in the folded configuration, form a stack of cells having the second shape.

10. The apparatus of claim 9, wherein a cell of the first set of cells is defined by a first set of dimensions and a cell of the second set of cells is defined by a second set of dimensions, the first set of dimensions being different from the second set of dimensions.

11. The apparatus of claim 10, wherein the first set of cells disposed on the sheet are foldable to form a first shape and the second set of cells disposed on the sheet are foldable to form a second shape, the first shape and the second shape being different shapes.

12. The apparatus of claim 9, further comprising connector pads that extend outwardly from each cell of the first set of cells and the second set of cells.

13. The apparatus of claim 12, wherein in the resulting folded battery configuration, the connector pads that extend outwardly from each cell of the first set of cells and each cell of the second set of cells are aligned.

14. The apparatus of claim 13, wherein the first set of cells has a greater number of cells than the second set of cells.

15. The apparatus of claim 14, wherein the first set of cells is disposed on the sheet opposite to the second set of cells disposed on the sheet, such that the resulting folded battery configuration comprises the connector pads extending outwardly from the first set of cells and the connector pads extending outwardly from the second set of cells being braided.

16. The apparatus of claim 9, further comprising:
a first set of the plurality of internal components having a first height; and
a second set of the plurality of internal components having a second height,
wherein a height of the first set of cells in the resulting folded battery configuration is equal to the first height of the first set of the plurality of internal components and a height of the second set of cells in the resulting folded battery configuration when combined with the height of the first set of cells in the resulting folded battery configuration is equal to the second height of the second set of the plurality of internal components.

* * * * *